United States Patent
Kessler

(10) Patent No.: US 8,123,638 B2
(45) Date of Patent: Feb. 28, 2012

(54) HIGH BOUNCE STRUCTURE: SKY BALL

(75) Inventor: Brian Kessler, Los Angeles, CA (US)

(73) Assignee: Maui Toys, Inc., Los Angeles, CA (US)

( * ) Notice: Subject to any disclaimer, the term of this patent is extended or adjusted under 35 U.S.C. 154(b) by 97 days.

(21) Appl. No.: 12/482,623

(22) Filed: Jun. 11, 2009

(65) Prior Publication Data

US 2010/0144471 A1    Jun. 10, 2010

Related U.S. Application Data

(60) Provisional application No. 61/193,553, filed on Dec. 5, 2008.

(51) Int. Cl.
*A63B 41/00* (2006.01)

(52) U.S. Cl. ........................ 473/609; 473/569

(58) Field of Classification Search .......... 473/594, 473/595, 603–606, 609, 569
See application file for complete search history.

(56) References Cited

U.S. PATENT DOCUMENTS

| | | | | |
|---|---|---|---|---|
| 712,412 A | * | 10/1902 | Richards | 473/604 |
| 3,241,834 A | * | 3/1966 | Stingley | 473/569 |
| 3,995,855 A | * | 12/1976 | Schultz | 473/594 |
| 4,306,719 A | * | 12/1981 | Haines et al. | 473/606 |
| 4,596,389 A | * | 6/1986 | Frankowski | 473/609 |
| 4,947,466 A | * | 8/1990 | Horiuchi et al. | 473/606 |
| 5,294,112 A | * | 3/1994 | Smith | 473/610 |
| 5,413,331 A | * | 5/1995 | Stillinger | 473/599 |
| 5,558,325 A | * | 9/1996 | Hargis et al. | 473/606 |
| 5,639,085 A | * | 6/1997 | Feeney et al. | 473/609 |
| 5,741,195 A | * | 4/1998 | Sullivan et al. | 473/603 |
| 5,766,707 A | * | 6/1998 | Obermaier | 473/604 |
| 6,056,622 A | * | 5/2000 | Chung | 446/435 |
| 2007/0049434 A1 | * | 3/2007 | Maziarz et al. | 473/604 |

OTHER PUBLICATIONS

"Trivia: How high should a tennis ball bounce?", http://www.arcamax.com/knowledge/trivia/s-130586-629573, retrieved May 24, 2011, posted Nov. 5, 2006.*

"Board Question #35310:The 100 Hour Board", http://theboard.byu.edu/questions/35310/, retrieved May 24, 2011, pp. 1-3, posted May 7, 2007.*

Cross, Rod, "Measurements of the horizontal coefficent of restitution for a superball and a tennis ball", American Journal of Physics 70(5), May 2002, pp. 482-489.*

"The Straight Dope: How high would a basketball bounce if dropped . . . ", http://boards.straightdope.com/sdmb/showthread.php?t=360868, retrieved May 24, 2011, pp. 1-5, p. 3, posted Feb. 28, 2006.*

* cited by examiner

*Primary Examiner* — Steven Wong
(74) *Attorney, Agent, or Firm* — Browdy and Neimark, PLLC

(57) ABSTRACT

A play ball having a high bounce capacity of at least 20 vertical feet and as much as 50 or 75 vertical feet is formed of a solid, elastomer thermoplastic polyurethane having a wall thickness of 3-5 mm, containing gas at a pressure preferably greater than 0.65 kfg/cm$^2$.

6 Claims, No Drawings

HIGH BOUNCE STRUCTURE: SKY BALL

The present invention relates to articles of commerce including play balls and shoe bottoms, i.e. heels and/or soles, which have a high bounce capacity.

BACKGROUND

Balls filled with air under pressure, including soccer balls, basketballs inflated to between 7.5 and 8.5 psig (0.53-0.60 kg/cm$^2$), footballs, volleyballs inflated to between 4 and 6 psig (0.28-0.42 kg/cm$^2$) and beach balls, all of which have non-elastic shells, are of course well known, and those for designated sports must not be over-inflated. Some known play balls, especially play balls for young children, have elastomeric shells, formed for example of natural and artificial rubbers, polyvinyl chloride (PVC) plastic, or in some cases even of other plastics having the desirable of properties of flexibility and resilience.

For some types of known balls, it is desirable that such balls have a capacity to bounce, and it is known that balls bounce more when inflated to a greater pressure. However inflation pressures are limited due to the requirements of the sport in question, or due to the inability of the shell material to avoid rupture at elevated pressures.

Solid balls of a relatively small diameter, i.e. up to about 5 cm or so, generally referred to as super balls and made of polybutadiene, have an exceptional ability to bounce to a much greater degree than any known air filled balls (see Stingley U.S. Pat. No. 3,241,834). Such super balls are limited in size because, if larger than about 3 cm or so, they become too heavy for normal play, and can impose a danger to children. It would be desirable if a hollow ball could be created which would have the bouncing capacity of a super ball.

In recent years, shoes and particularly athletic shoes have been developed in which the soles and/or heels contain either mechanical springs or air so as to provide such shoes with more cushion and "bounce" than regular shoes. Many of these constructions are highly complex, e.g. see Peng U.S. Pat. No. 4,680,876, Kilgore et al U.S. Pat. No. 5,343,639, and McMahon et al U.S. Pat. No. 4,342,158. However, the degree of bounce in such shoe soles is greatly limited.

SUMMARY OF INVENTION

It is an object of the present invention to overcome one or more of the deficiencies in the prior art, such as indicated above.

It is another or alternative object to provide products, particularly inflated hollow balls and shoes, with more "bounce."

These and/or other objects are achieved according to the present invention by providing a shell of solid elastomer polyurethane, especially a highly elastic thermoplastic polyurethane based on methylene diphenyl diisocyanate (MDI), having a wall thickness of at least 3 mm filled with a suitable gas under high inflation pressure, the gas being air, helium, oxygen or nitrogen oxide (NO).

DETAILED DESCRIPTION OF EMBODIMENTS

In the case of a ball, named "Sky Ball", a spherical shell is formed of solid, elastomer polyurethane having a wall thickness of 3-5 mm, capable of withstanding a temperature of 200-300° C., and in one embodiment having a diameter of approximately 9.2 cm. The ball is injected with a gas, preferably air, under high inflation pressure of 0.5-0.8 kfg/cm$^2$, preferably greater than 0.65 kfg/cm$^2$, and is found to bounce as much as 75 feet vertically when thrown with sufficient force downwardly on to a hard surface. The average adult can easily bounce this ball to over 50 ft.

There are a number of important factors which contribute to the high bounce capability, including (1) selection of an appropriate elastomer for the shell of the ball, (2) the wall thickness of the shell, (3) the gas within the shell, and (4) the pressure of the gas within the shell. With respect to the wall thickness, it has been found that walls of a thickness less than 3 mm are unsatisfactory, and that wall thicknesses of 3-5 mm are optimal. Walls more than 5 mm thick add unnecessary weight, and also adversely affect the bounce properties as well as the overall cost. Wall thicknesses less than 3 mm do not permit sufficiently high inflation pressures which contribute to the high bounce capabilities of the ball.

Selection of an appropriate shell material is of particular importance. PVC as well as various polyurethanes have been tried without success. However, a soft, plasticized, highly elastic, polyester based, solid, thermoplastic polyurethane resin, which is non-toxic, colorless and transparent, has been found suitable. Such polyurethane is a methylene diphenyl diisocyanate (MDI) reaction product with a polyol formed from about 25 wt % of the MDI and about 70 wt % of a polyol having at least two functional OH groups and a molecular weight of from 1000 to 10,000, together with about 5 wt % of a chain extender having a molecular weight of about 50 to about 800, the chain extender having at least two functional OH groups or at least two NH$_2$ functional groups. The resultant highly elastic, solid, thermoplastic polyurethane resin has density of about 1.1 to about 1.2 g/cm$^3$, preferably about 1.1 g/cm$^3$, a melting point of 220° C. and a Shore A hardness of about 70 to about 90.

Particularly suitable is such a polyester based thermoplastic polyurethane resin (TPU) sold under the trademark Estane® 58070 by Lubrizol Advanced Materials, Inc. of Cleveland, Ohio. Estane® 58070 has a Shore A hardness of 72, a specific gravity or density of 1.17, a tensile strength of 45 MPa, an ultimate elongation of 700%, a tensile stress at 100% elongation of 4 MPa, a tensile stress at 300% elongation of 6 MPa, a Graves tear strength of 7.9 kg/mm, and a glass transition temperature $T_g$ of −52° C.

Other elastic materials can be routinely tested for suitability, the criteria being the ability to hold gas under substantial pressure and for the resultant ball to bounce a substantial vertical height when thrown downwardly with force, i.e. at least 20 feet, preferably at least 35 feet, and more preferably at least 50 feet.

The rubbery and elastic shell is also desirably transparent or clear, or at least translucent, although this is not a requirement. If clear or translucent, it can be color tinted or impregnated with various decorative elements such as glitter. Moreover, when the material of the shell is relatively transparent, glitter may be added within the gas inflated hollow to provide an added decorative effect.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. An amusement ball comprising
a hollow shell of a solid, rubbery and elastic material formed of a soft, highly elastic polyester-based thermoplastic polyurethane resin,
the hollow shell having a wall thickness of 3-5 mm,
the ball being filled with a gas under a pressure of greater than 0.65 up to 0.8 kgf/cm$^2$, and
the ball being characterized in having a bounce capability such that when thrown downward it can bounce up to over 20 feet vertically;
wherein the soft, highly elastic polyester-based thermoplastic polyurethane resin is a polyester/MDI-based thermoplastic polyurethane resin having a tensile strength of at least about 45 MPa, an ultimate elongation of at least about 700%, and a shore A hardness of 70-90, and
wherein said amusement ball is transparent or translucent.

2. The amusement ball of claim 1 characterized in that it can bounce upwardly to over 35 feet vertically.

3. The amusement ball of claim 1 characterized in that it can bounce upwardly to over 50 feet vertically.

4. An amusement ball comprising
a hollow shell of a solid, rubbery and elastic material,
the hollow shell having a wall thickness of 3-5 mm,
the ball being filled with a gas under a pressure of 0.5-0.8 kgf/cm$^2$, and
the ball being characterized in having a bounce capability such that when thrown downward it can bounce up to over 20 feet vertically;
wherein the shell is formed of a methylene diphenyl diisocyanate and polyol reaction product comprising approximately 25 wt % of the methylene diphenyl diisocyanate and 70 wt % of the polyol, the polyol having a molecular weight of 1000-10,000, and optionally about 5 wt % of a chain extender having a molecular weight of 50-800, the polyurethane reaction product having a density of about 1.1 to about 1.2 g/cm$^3$ and a Shore A hardness of 70-90.

5. An amusement ball comprising
a hollow shell of a solid, rubbery and elastic material,
the hollow shell having a wall thickness of 3-5 mm,
the ball being filled with a gas under a pressure of 0.5-0.8 kgf/cm$^2$, and
the ball being characterized in having a bounce capability such that when thrown downward it can bounce up to over 20 feet vertically;
wherein the shell is formed of a polyester based thermoplastic polyurethane resin having a Shore A hardness of 72, a specific gravity of 1.17, a tensile strength of 45 MPa, and ultimate elongation of 700%, a tensile stress at 100% elongation of 4 MPa, a tensile stress at 300% elongation of 6 MPa, a Graves tear strength of 7.9 kg/mm, and a glass transition temperature of −52° C.

6. The amusement ball of claim 2, having a diameter of approximately 9.2 cm.

* * * * *